Nov. 23, 1965  E. J. SCHAEFER  3,219,898

MULTI-SPEED ELECTRIC MOTORS

Filed June 19, 1961  2 Sheets-Sheet 1

INVENTOR.
Edward J. Schaefer,
BY
Davis, Lindsey, Hibben & Noyes
Atty's.

Nov. 23, 1965   E. J. SCHAEFER   3,219,898
MULTI-SPEED ELECTRIC MOTORS
Filed June 19, 1961   2 Sheets-Sheet 2
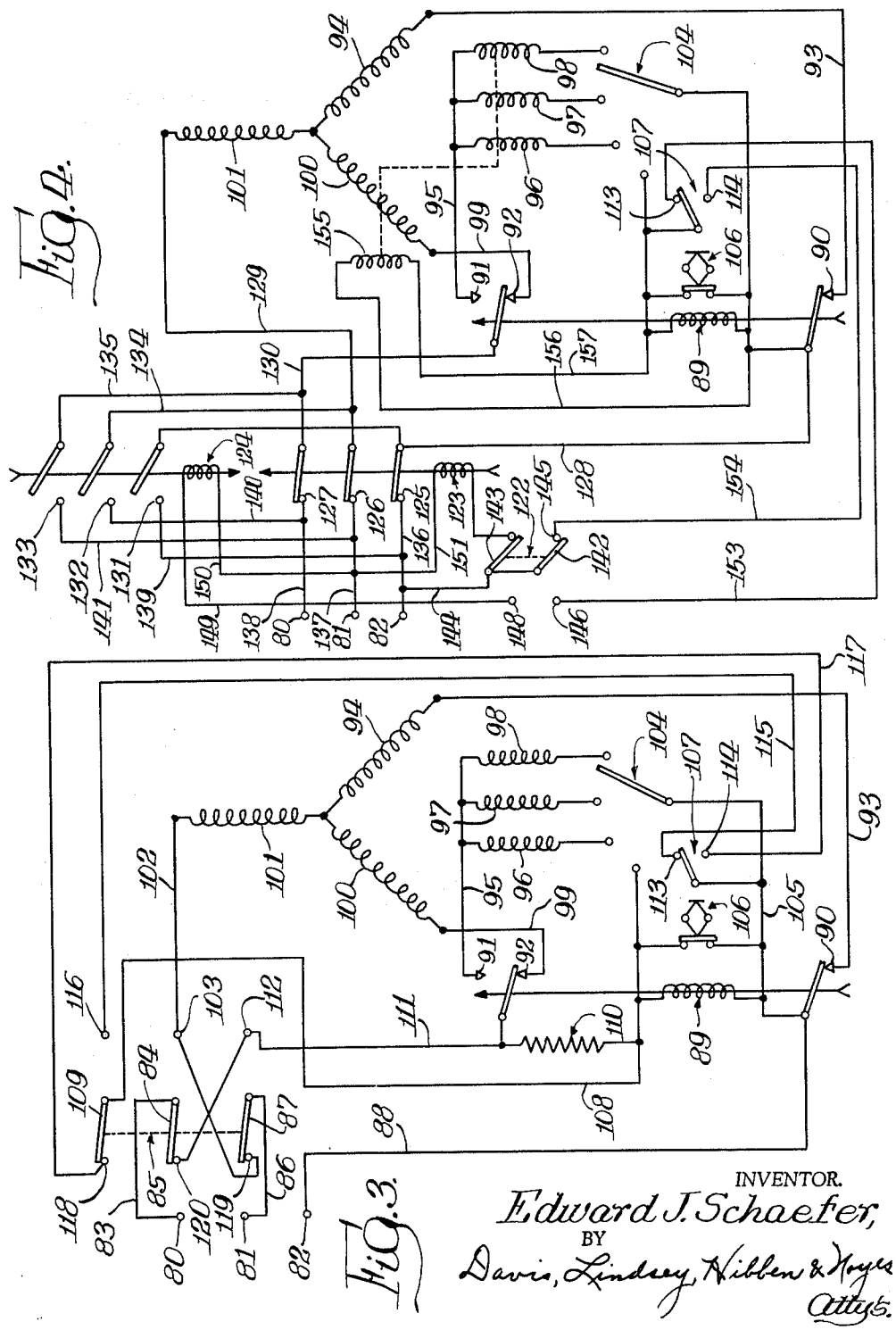
INVENTOR.
Edward J. Schaefer,
BY
Davis, Lindsey, Hibben & Noyes
Attys.

United States Patent Office 3,219,898
Patented Nov. 23, 1965

3,219,898
MULTI-SPEED ELECTRIC MOTORS
Edward J. Schaefer, Bluffton, Ind., assignor to Franklin Electric Co., Inc., Bluffton, Ind., a corporation of Indiana
Filed June 19, 1961, Ser. No. 117,874
15 Claims. (Cl. 318—202)

This invention relates to improvements in multi-speed electric motors and more particularly to multi-speed motors of the polyphase type.

The primary object of the present invention is to provide a novel motor having a simple arrangement for shifting from operation at one speed to operation at a different speed.

A further object is to provide a novel multi-speed motor which will begin operation as a polyphase motor and may be manually set to operate at running speed as a single phase motor.

Another object is to provide a novel multi-speed motor which is shifted, when manually set, from operation as a polyphase motor at one speed to operation as a single phase motor at a different speed in response to the speed of operation of the motor.

Another object is to provide a novel multi-speed motor which may be instantly reversed to operate at either speed in either direction.

Other objects and advantages of the invention will become evident from the subsequent detailed description taken in conjunction with the accompanying drawings wherein:

FIG. 3 is a schematic circuit diagram of a further embodiment of a multi-speed polyphase motor operable at different speeds and having an instantly reversing arrangement; and FIG. 4 is a schematic circuit diagram of still another embodiment of a multi-speed polyphase motor with a reversing arrangement.

Generally, each embodiment of the present invention is provided with polyphase windings for starting and running of the motor at one speed, and one or more single phase auxiliary windings for operating or running the motor at different speeds. The main polyphase windings are used for developing the starting and reversing torques and the motor may continue to operate at the speed provided by such windings but, if the motor is to be operated at a different speed from that provided by the main polyphase windings, a switch may be provided to cause a shift to the selected one of the single phase auxiliary windings. Such switch may be a centrifugal or speed responsive switch to shift to the single phase winding when the motor reaches a predetermined speed. In the motor arrangement of FIG. 1, the centrifugal or speed responsive switch directly controls the shifting of the motor to the selected auxiliary winding. In the motors of FIGS. 2, 3, and 4, a relay which is manually rendered operable is provided for controlling the connection of the selected single phase auxiliary winding for operation of the motor from that winding. The centrifugal switch is arranged to open upon reaching a predetermined speed and causes the relay to operate to shift from the main windings to the auxiliary windings. The embodiments of FIGS. 3 and 4 are additionally provided with an instantly reversing function. The reversing feature is substantially that shown in my U.S. Patent No. 2,847,629, issued August 12, 1958.

It is to be understood that the motors of each of the embodiments include a rotor of the squirrel cage type and that each of the windings thereof, both main and auxiliary, may be arranged in any desired number of poles. For example, the main windings may be each wound at two poles to provide a high speed operation of the motor, with the auxiliary windings being wound with appropriately more poles to provide operation at lower speeds.

Figure 1:
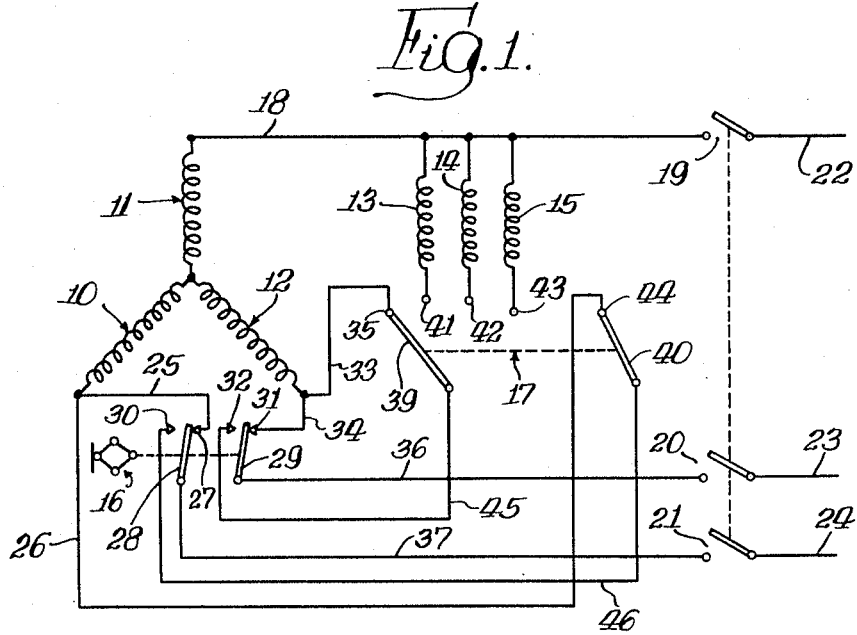
FIG. 1 is a schematic diagram of a polyphase motor operable at different speeds and embodying the features of the invention.
Figure 2:
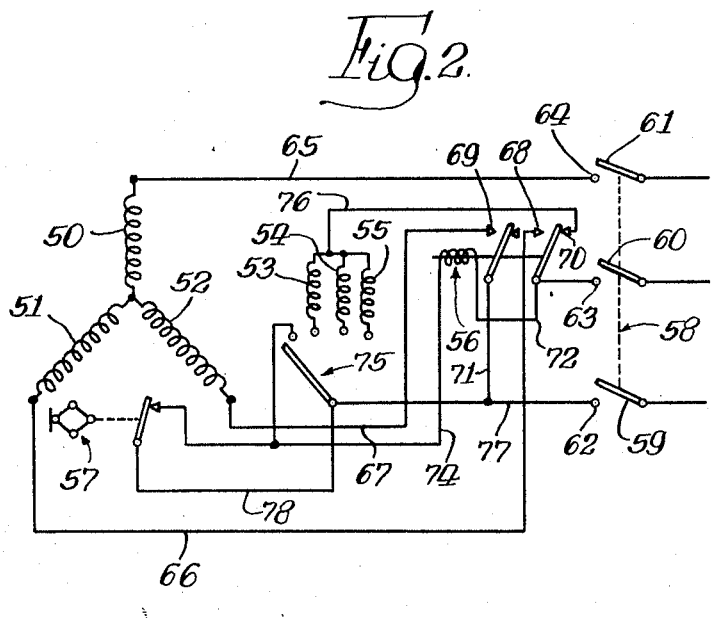
FIG. 2 is a schematic circuit diagram of another embodiment of a polyphase motor operable at different speeds.

In the embodiment shown in FIG. 1, the motor is a polyphase motor having three phase main windings 10, 11 and 12 for starting and running of the motor at one speed as a polyphase motor. Single phase auxiliary windings 13, 14 and 15 are provided for operation of the motor as a single phase motor at three different running speeds. A switch 16 is provided for directly shifting the motor from the main windings to any selected one of the auxiliary windings, the switch 16 in this instance being a centrifugal or speed repsonsive switch. A manually operable double-pole four position switch 17 is provided for running the motor as a polyphase motor or as a single phase motor from any one of the single phase auxiliary windings 13, 14 and 15. One end of each of the main windings 10, 11 and 12 are connected together in the usual manner. The other end of winding 11 is connected to one end of a conductor 18. The other end of conductor 18 is connected to one side of a switch 19. Switch 19 is mechanically connected in a ganged arrangement with switches 20 and 21 to provide a line switch for the three phase line conductors 22, 23 and 24. One end of each of the auxiliary windings 13, 14 and 15 is also connected to conductor 18.

The other end of main winding 10 is connected to a conductor 25 and to a conductor 26. The conductor 25 is in turn connected to contact 27 of the centrifugal or speed responsive switch 16. Centrifugal switch 16 comprises two poles 28 and 29 which respectively alternately engage contacts 27 and 30, and 31 and 32. The centrifugal switch 16, which may be of any suitable type known in the art, is adjusted so that when the motor is stopped or operating below a certain speed, pole 28 engages contact 27 and pole 29 engages contact 31. When the motor reaches said certain speed, pole 28 will disengage contact 27 and engage contact 30, and pole 29 will disengage contact 31 and engage contact 32. When the motor is slowed to a certain speed, which need not be the same as the aforementioned certain speed, the reverse action takes place with the centrifugal switch 16 shifting to the position shown in FIG. 1.

The other end of main winding 12 is connected both to a conductor 33 and to a conductor 34. The conductor 33 is connected to the first position contact 35 of the switch 17. The conductor 34 is connected to contact 31 of centrifugal switch 16. The pole 29 of centrifugal switch 16 is connected to one end of a conductor 36, and the other end of conductor 36 is connected to one side of the line switch 20. Pole 28 of centrifugal switch 16 is connected to one end of a conductor 37 and the other end of conductor 37 is connected to one side of the line switch 21. Thus it may be seen that, with the motor stopped and with the line switches 19, 20 and 21 closed, the folowing three circuits are completed for operation of the motor as a polyphase motor: first, from line conductor 22, line switch 19, and conductor 18 to main winding 11; second, from line conductor 23, line switch 20, conductor 36, pole 29 of centrifugal switch 16, contact 31 and conductor 34 to main winding 12; and third, from line conductor 24, line switch 21, conductor 37, pole 28 of centrifugal switch 16, contact 27 and conductor 25 to main winding 10.

The switch 17 comprises poles 39 and 40 and the switch contacts 35, 41, 42, 43 and 44. The switch 17 is so constructed that, in the first position thereof, pole 39 engages contact 35 and pole 40 engages pole 44, and in the other three positions of the switch, pole 39 consecutively engages contacts 41, 42 and 43. In the second, third and fourth positions of the switch, pole 40 engages no contact. Pole 39 is connected by a conductor 45 to contact 32, and pole 40 is connected by a conductor 46 to contact 30 of centrifugal switch 16. The switch contacts 41, 42 and 43 are respectively connected to the auxiliary windings 13, 14 and 15.

In describing the operation of the embodiment of FIG. 1, it is first assumed that the switch 17 is in the first operated position thereof, wherein poles 39 and 40 respectively engage switch contacts 35 and 44, and that the line switches 19, 20 and 21 are closed. The motor will begin operation as a polyphase motor over the three circuits above described. When the centrifugal switch 16 reaches the predetermined speed for operation thereof to shift the poles 28 and 29 from contacts 27 and 31 respectively to contacts 30 and 32, the two circuits whereby main windings 10 and 12 were respectively connected to line conductors 24 and 23 will be broken. However, the following two circuits will again establish connection of windings 10 and 12 to the line conductors 24 and 23 to maintain the motor operating as a polyphase motor: first, from line conductor 23, switch 20, conductor 36, pole 29, contact 32, conductor 45, pole 39, contact 35, and conductor 33 to winding 12; and second, from line conductor 24, switch 21, conductor 37, pole 28, contact 30, conductor 46, pole 40, contact 44, and conductor 26 to winding 10. Thus, with the switch 17 operated to its first position, the motor will start and run as a polyphase motor.

To run the motor from one of the single phase auxiliary windings, it is merely necessary to operate the switch 17 to a selected one of the windings 13, 14 and 15. If the switch 17 is operated so that the pole 39 engages contact 41, winding 13 is selected as the running speed winding. The motor will again start as a polyphase motor operated by the windings 10, 11 and 12. However, when the centrifugal switch operates to shift poles 28 and 29 respectively to engage contacts 30 and 32 upon the motor attaining the speed for which centrifugal switch 16 has been set to operate, the circuit for winding 10 will be broken at contact 27 and the engagement of pole 28 with contact 30 will have no effect at this time due to pole 40 of switch 17 engaging no contact. The circuit for winding 12 will be broken at contact 31, the pole 39 having been moved out of engagement with the contact 35. The following circuit will then be established for running of the motor as a single phase motor from winding 13: from line conductor 22, switch 19, conductor 18, auxiliary winding 13, switch contact 41, pole 39, conductor 45, contact 32, pole 29, conductor 36, switch 20, to line conductor 23. Thus it may be seen that the starting operation of the motor as a polyphase motor, and in the running operation of the motor is as a single phase motor.

In the embodiment shown in FIG. 2, the motor is a polyphase motor having three phase main windings 50, 51 and 52 for starting running at one speed. Auxiliary windings 53, 54 and 55 are provided for operation of the motor as a single phase motor at three different running speeds. A relay 56 and a centrifugal or speed responsive switch 57 are used to shift the motor from the main windings to the auxiliary windings. As opposed to the embodiment of FIG. 1 wherein the centrifugal switch 16 directly shifts the windings, in the embodiment of FIG. 2 the centrifugal switch 57 controls the operation of the relay 56 which shifts the motor from the main windings to the auxiliary windings. A motor starting switch 58 is provided and comprises three poles 59, 60 and 61 having a single throw. Each of the poles 59, 60 and 61 is connected to one line conductor of a three phase power line. In the closing of switch 58, pole 59 will connect one line conductor to contact 62, pole 60 will connect the second line conductor to contact 63 and pole 61 will connect the third line conductor to contact 64.

Contact 64 is connected by a conductor 65 to one end of winding 50. The other end of winding 50 is connected to one end of each of windings 51 and 52 in the usual manner. The other end of winding 51 is connected to one end of a conductor 66, and the other end of winding 52 is connected to one end of a conductor 67. The other end of conductor 66 is connected to a relay contact 68, and the other end of conductor 67 is connected to a relay contact 69. In addition to contacts 68 and 69, relay 56 also is provided with a contact 70. The armature of relay 56 carries two electrically separate contacts, one of which is connected to one end of a conductor 71, and the other of which is connected to contact 63 of switch 58 and to one side of the coil of relay 56 through conductor 72. When relay 56 is energized, the contact 63 and conductor 72 are disconnected from relay contact 70 and connected with contact 68, and conductor 71 is connected to relay contact 69.

The other side of the coil of relay 56 is connected to one end of a conductor 74, and the other end of conductor 74 is connected to the contact of centrifugal switch 57 and the first contact of a single-pole four-position switch 75. One end of the auxiliary winding 53 is connected to the second contact of switch 75, one end of the second auxiliary winding 54 is connected to the third contact of switch 75, and one end of the third auxiliary winding 55 is connected to the fourth contact of switch 75. The other ends of the auxiliary windings 53, 54 and 55 are all connected to one end of a conductor 76, the other end of which is connected to relay contact 70. A conductor 77 interconnects contact 62 of switch 58, conductor 71 and the pole of switch 75. The pole of switch 75 is also connected to the pole of the centrifugal switch 57 by a conductor 78.

In the operation of the embodiment of FIG. 2, it is first assumed that the switch 58 is shifted to close its contacts and that switch 75 is in the first position. The following circuit for the energization of relay 56 is completed: from pole 60, contact 63, conductor 72, the coil of relay 56, conductor 74, the contact for the first position of switch 75, the pole of switch 75, conductor 77, contact 62, to pole 59. An alternate circuit including centrifugal switch 57 may be traced through the centrifugal switch 57 for the energization of relay 56. However, that circuit is unimportant so long as the switch 75 is positioned in its first position. Relay 56 upon energization will complete two circuits for connection of the windings 51 and 52 to the line conductors. The first of these circuits may be traced as follows: from pole 60, contact 63, relay contact 68, conductor 66, to winding 51. The other circuit may be traced from pole 59, contact 62, conductor 77, conductor 71, relay contact 69, conductor 67 to winding 52. Winding 50 is connected to the third line conductor over an obvious circuit upon the initial closing of the switch 58. The motor will then operate as a conventional polyphase motor from the three windings 50, 51 and 52. Since the centrifugal switch 57 is not in any of these circuits it will have no effect on the operation of the motor when the switch 75 is set at its first position.

For operation of the motor when the switch 75 has been moved to the second position, with the pole of the switch 75 engaging auxiliary winding 53, the previously described circuit for the energization of relay 56 is open. However, the relay 56 is then energized over the following circuit: pole 60, contact 63, conductor 72, the coil of relay 56, conductor 74, centrifugal switch 57, conductor 78, conductor 77, contact 62, to pole 59. Relay 56 when energized will complete the previously described circuits for windings 51 and 52 so that as previously described the motor will begin operation as a polyphase motor from the three windings 50, 51 and 52.

When the motor reaches the speed for which the centrifugal switch 57 has been set to open, that switch will open, breaking the described circuit for the energization of relay 56. Relay 56 on being de-energized will break the previously described circuits for windings 51 and 52 and will establish the following circuit for auxiliary winding 53: pole 60, contact 63, relay contact 70, conductor 76, winding 53, the pole of switch 75, conductor 77, contact 62 to pole 59. The motor will then operate at its running speed as a single phase motor rather than a polyphase motor and at a different speed particularly determined by winding 53.

It will be apparent that the motor may be operated at its running speed from either windings 54 or 55 in the same manner by an appropriate positioning of the switch 75. The operation of the motor from either of these windings will be substantially the same as that described for winding 53. In other words, the motor will always start as a polyphase motor and when the speed for which centrifugal switch 57 is set to open is reached, the motor will be shifted from the polyphase windings to one of the single phase windings for operation of the motor as a single phase motor.

In the embodiment shown in FIG. 3, terminals 80, 81 and 82 are adapted to be connected to a three-phase power line. Terminal 80 is connected by a conductor 83 to a pole 84 of a switch 85. Switch 85 is a three-pole double-throw switch and in the present embodiment provides the instantly reversing feature. Terminal 81 is connected by a conductor 86 to a pole 87 of switch 85. Terminal 82 is connected by a conductor 88 to an armature contact of a relay 89. The cooperating fixed contact adapted to be engaged by the armature contact of relay 89 is designated 90. Relay 89 further carries an armature contact which alternatively engages fixed relay contacts 91 and 92. In the de-energized condition of relay 89, the armature contacts engage fixed contacts 90 and 92 and in the energized condition, contacts 90 and 92 are disconnected from their associated armature contacts and fixed contact 91 is engaged by its associated armature contact. Relay contact 90 is connected by a conductor 93 to one end of a polyphase motor winding 94. Relay contact 91 is connected by a conductor 95 in parallel to one end of each of a plurality of single phase auxiliary windings 96, 97 and 98. Relay contact 92 is connected by a conductor 99 to one end of another polyphase motor winding 100. The other end of the polyphase motor windings 94 and 100 are interconnected and connected in the usual manner to one end of a third polyphase motor winding 101. The other end of the winding 101 is connected by a conductor 102 to a contact 103 of switch 85. The other end of the auxiliary windings 96, 97 and 98 are adapted to be selectively connected to the pole of a single-throw four position switch 104. The pole of switch 104 is connected by a conductor 105 to the armature contact of relay 89 which is associated with fixed relay contact 90.

The conductor 105 provides a common electrical connection of three other elements in the present embodiment. The first is one side of the coil of relay 89, the second is one side of a centrifugal switch 106, and the third is the pole of a motor direction responsive switch 107. The other side of the coil of relay 89 and the other side of the centrifugal switch 106 are connected to a conductor 108. One end of conductor 108 terminates at the first contact of the four-position switch 104. The other end of conductor 108 is connected to a pole 109 of switch 85. One end of a resistor 110 is also connected to conductor 108. The other end of resistor 110 is connected to the armature contact of relay 89 which is associated with relay contacts 91 and 92, and is also connected by a conductor 111 to a switch contact 112 of switch 85.

The direction sensing switch 107 includes contacts 113 and 114 alternatively engageable by the pole of the switch dependent upon the direction of rotation of the motor. Contact 113 is connected by a conductor 115 to a contact 116 of switch 85. Contact 114 of switch 107 is connected by a conductor 117 to a contact 118 of switch 85. The contact 103 of switch 85 is directly connected to a contact 119 of that switch, and contact 112 is directly connected to a contact 120 of that switch. Switch 85 is so arranged that in one operated position of the switch, pole 87 engages contact 119, pole 84 engages contact 120 and pole 109 engages contact 118, and in the other operated position of the switch, pole 87 engages contact 112, pole 84 engages contact 103 and pole 109 engages contact 116.

As the hereinafter described operation will show, the embodiment of FIG. 3 will always begin its operation as a polyphase motor and may continue to run as a polyphase motor at one speed or may be changed to run as a single phase motor selectively at any one of three different speeds. The instantly reversing feature forms an important portion of this embodiment and the reversing torque is always supplied by the three phase windings. The arrangement of the instantly reversing feature is substantially that shown in my prior Patent No. 2,847,629.

Assuming first that the switches 85 and 107 are in the operated positions shown in the drawing, and that the switch 104 is adjusted so that its pole engages the first contact of that switch, the following circuits are completed: first, from terminal 80, conductor 83, pole 84 of switch 105, contact 120, contact 112, conductor 111, relay contact 92, and conductor 99 to one end of winding 100; second, from terminal 81, conductor 86, pole 87 of switch 85, contact 119, contact 103, and conductor 102 to winding 101; and third, from terminal 82, conductor 88, relay contact 90, and conductor 93 to winding 94. At this time resistor 110 is also connected across terminals 80 and 82. However, the resistor 10 will have no appreciable effect upon the voltage developed across the windings 100 and 94 since the resistance of the resistor 110 is relatively high. The motor will then start and run from the three phase windings 101, 100 and 94. The relay 89 of course is de-energized during such operation because it is short circuited by the centrifugal switch 106 and the switch 104. The opening of the centrifugal switch 106 when the motor reaches the speed for which the switch is adjusted will have no effect upon the three phase operation since the switch 104 in the first position maintains a shunt across the centrifugal switch 106.

The motor may be reversed in its direction of rotation by manual operation of the switch 85 from the position shown in FIG. 3 to its other operated position wherein the poles 87, 84 and 109 respectively engage contacts 112, 103 and 116. In that operated position of the switch 85 the following circuits are completed: first, from terminal 80, conductor 83, pole 84, contact 103, and conductor 102 to winding 101; and second, from terminal 81, conductor 86, pole 87, contact 112, conductor 111, relay contact 92, and conductor 99 to winding 100. Terminal 82 obviously remains connected to winding 94. Negative or reverse torque will then be applied to the motor causing it to slow down, stop and begin operation in the reverse direction. Upon the reverse operation of the motor, the direction sensing switch 107 will be operated to remove the connection of its pole from contact 113 to engagement with contact 114. The operation of the direction sensing switch 107 is, however, of no importance when the motor is operated solely as a three phase motor.

For operation of the motor when the switch 104 is shifted to its second position, with its pole engaging auxiliary winding 96, the three previously described circuits for windings 101, 100 and 94 will cause the motor to start as a three phase motor. When the motor reaches the speed for which the centrifugal switch 106 is set to open, that switch will open to remove the shunt across the coil of relay 89, and relay 89 will then be energized over the following circuit: from terminal 80, conductor 83, pole 84 of switch 85, contact 120, contact 112, conductor 111, resistor 110, the coil of relay 89, conductor 105, and conductor 88 to terminal 82. In energizing, the relay 89 will break the circuits for the three phase windings at relay contacts 90 and 92 and will establish the following circuit for running the motor from winding 96: from terminal 80, conductor 83, pole 84 of switch 85, contact 120, contact 112, conductor 111, relay contact 91, conductor 95, auxiliary winding 96, the pole of switch 104, conductor 105, and conductor 88 to terminal 82. The motor will then operate as a single phase motor at a running speed determined by the number of poles of winding 96.

When it is desired to reverse the operation of the motor while it is running as a single phase motor from the auxiliary winding 96, it is merely necessary to operate the switch 85 from the position shown to its other operated position, that wherein the poles 87, 84 and 109 respectively engage contacts 112, 103, and 116. That operation of the switch 85 will complete the following circuit which places a shunt across the coil of relay 89: from one side of the coil of relay 89, conductor 108, pole 109 of switch 85, contact 116, conductor 115, contact 113 and the pole of direction sensing switch 107, and conductor 105 to the other side of the coil of relay 89. This shunt circuit will cause relay 89 to be de-energized, breaking the previously described circuit for winding 96 and establishing the first described circuits for the windings 101, 100 and 94 which will apply a negative or reversing torque to the motor. This reverse torque will cause the motor to slow down, and when the speed for which the centrifugal switch 106 is set to close is reached, that switch will close completing its shunt circuit across the coil of relay 89.

After the motor comes to a stop and begins operation in the reverse direction, the direction sensing switch 107 will operate to cause the pole to disengage contact 113 and engage contact 114. This operation of the switch 107 will break the previously described shunt circuit involving the contact 113 from across the coil of relay 89. The motor will then gain speed in the reverse direction as a three phase motor and upon reaching the speed for which the centrifugal switch 106 is set to open, that switch will open, removing the shunt effected by that switch from across the coil of relay 89. Relay 89 will then be energized over the following circuit: from terminal 81, conductor 86, pole 87 of switch 85, contact 112, conductor 111, resistor 110, the coil of relay 89, conductor 105, and conductor 88 to terminal 82. Relay 89 upon being energized will break the circuits for the three phase windings 101, 100 and 94 and will establish the following circuit for running of the motor as a single phase motor from winding 96: from terminal 81, conductor 86, pole 87 of switch 85, contact 112, conductor 111, relay contact 91, conductor 95, winding 96, the pole of switch 104, conductor 105, and conductor 88 to terminal 82.

The motor may easily again be reversed in direction of rotation by merely returning the switch 85 to the initially described operated condition. With a returning of the switch 85 to that position the following shunt circuit across the coil of relay 89 is completed: from one side of the coil of relay 89, conductor 108, pole 109 of switch 85, contact 118, conductor 117, contact 114 of direction sensing switch 107, the pole of switch 107 and conductor 105 to the other side of the coil of relay 89. Again, relay 89 will be de-energized, disconnecting the single phase winding 96 and re-establishing the circuits for the three phase windings 101, 100 and 94. Again, reverse torque will be applied by the three phase windings to bring the motor to a stop and restart it in the other direction from the three phase windings.

It will be apparent from the drawing that the motor may be operated from the other single phase auxiliary windings 97 and 98 in a manner similar to that described for winding 96, it merely being necessary to operate the switch 104 to either the third or fourth positions thereof. From the foregoing it may be seen that this embodiment of the present invention comprises a motor which will always start as a three phase motor and in which the reversing torque will also always be supplied by the three phase windings. The motor may selectively be run at one speed as a three phase motor or at any one of three other speeds as a single phase motor. Further, the motor may be instantly and easily reversed in its direction of rotation.

In the following description of the embodiment shown in FIG. 4, the elements thereof which are substantially the same as those of FIG. 3 are designated with the same numerals. The basic difference between these two embodiments are first, that the relay 89 in FIG. 4 is not directly energized from the line terminals but from a coil which is inductively coupled to the windings 100, 96, 97 and 98, and second, that the reversing switch 85 of FIG. 3 is replaced in FIG. 4 by a different switch and multiple relay arrangement. This switch and relay arrangement comprises a double-pole double-throw switch 122 and relays 123 and 124. Each of the relays 123 and 124 is constructed with the armature thereof carrying three sets of normally open relay contacts. Relay 123 is provided with three stationary contacts 125, 126 and 127. The armature contact associated with contact 125 is connected to a conductor 128, the armature contact associated with contact 126 is connected to a conductor 129, and the armature contact associated with contact 127 is connected to a conductor 130. Relay 124 comprises three fixed contacts 131, 132 and 133. The armature contact associated with contact 131 is connected to the conductor 128, the armature contacte associated with contact 132 is connected by a conductor 134 to the conductor 129, and the armature contact associated with contact 133 is connected by a conductor 135 to the conductor 130. Energization of each of the relays 123 and 124 causes engagement of each armature contact with its associated fixed contact. Contact 125 of relay 123 is connected by a conductor 136 to line terminal 82, contact 126 is connected by a conductor 137 to a line terminal 81, and contact 127 is connected by a conductor 138 to line terminal 80. Contact 131 of relay 124 is connected by a conductor 139 to conductor 136, contact 132 is connected by a conductor 140 to conductor 138, and contact 133 is connected by a conductor 141 to conductor 137.

The poles 142 and 143 of switch 122 are connected by a conductor 144 to conductor 136. Pole 142 alternatively engages contacts 145 and 146, while pole 143 alternatively engages contacts 147 and 148. Contact 148 is connected by a conductor 149 to one side of the coil of relay 124. The other side of the coil of relay 124 is connected by a conductor 150 to conductor 137. One side of the coil of relay 123 is connected by a conductor 151 to conductor 137, and the other side of the coil of relay 123 is connected to contact 147 of switch 122. Thus, when the pole 143 engages contact 148, the coil of relay 124 is energized from terminals 82 and 81, and when the pole 143 engages contact 147, the coil of relay 123 is energized from the same two terminals.

Contact 146 of switch 122 is connected by a conductor 153 to contact 113 of the direction sensing switch 107. Contact 145 of switch 122 is connected by a conductor 154 to contact 114 of the switch 107. Conductor 128 which is connected to one of the armature contacts of each of the relays 123 and 124 is also connected to the armature contact of relay 89, which is adapted to engage relay contact 90 when the relay 89 is de-energized. Conductor 129 which is connected to one of the armature contacts of each of the relays 123 and 124 is also connected to winding 101. Conductor 130 which is connected to one of the armature contacts of each of the relays 123 and 124 is also connected to the armature contact of relay 89, which is associated with relay contacts 91 and 92 thereof. The coil of relay 89 is adapted to be energized by a voltage induced in a coil 155. Coil 155 is inductively coupled to windings 100, 96, 97 and 98 so that any current passing through these windings will induce a voltage across coil 155. The coil of relay 89 and the coil 155 are interconnected by conductors 156 and 157. Conductor 157 also provides a common electrical connection for one side of the centrifugal switch 106, the pole of switch 107, and the first contact of the four-position switch 104. Conductor 156 also provides a common electrical connection for conductor 128, the other side of the centrifugal switch 106, and the pole of the switch 104.

Assuming for the operation of the embodiment of FIG. 4, that switches 122 and 107 are in the positions shown in FIG. 4, and that the pole of switch 104 engages the first contact thereof, relay 123 will be energized as heretofore described and will close its contacts to complete the following circuits: first, from line terminal 80, conductor 138, relay contact 127, conductor 130, relay contact 92, and conductor 99 to winding 100; second, from line terminal 81, conductor 137, relay contact 126, conductor 129, to winding 101; and third, from line terminal 82, conductor 136, relay contact 125, conductor 128, relay contact 90, and conductor 93 to winding 94. The motor will then start and run from the three phase windings 101, 100 and 94. Nothing will occur when the centrifugal switch 106 opens at the speed for which it is set, since the switch 104 maintains a shunt across the coil of relay 89 to prevent any operation thereof.

To next reverse the direction of rotation of the motor while operating from the three phase windings 101, 100 and 94, the switch 122 is operated to its other position, with the poles 142 and 143 respectively engaging contacts 146 and 148. This operation of the switch 122 will break the circuit for the energization of relay 123 and will complete the heretofore described circuit for the energization of relay 124. When relay 123 is de-energized, it will obviously break the previously described circuits for the windings 101, 100 and 94, and the energization of relay 124 will establish the following circuit supplying negative torque and running the motor in the reverse direction: first, from line terminal 80, conductor 138, conductor 140, relay contact 132, conductor 134, conductor 129 to winding 101; second, from line terminal 81, conductor 137, conductor 141, relay contact 133, conductor 135, conductor 130, relay contact 92, and conductor 99 to winding 100; and third, from line terminal 82, conductor 136, conductor 139, relay contact 131, conductor 128, relay contact 90, and conductor 93 to winding 94. Thus, for the three phase operation provided when the switch 104 engages the first contact thereof, all starting, running and reversing torques are supplied by the three phase windings 101, 100 and 94.

Assuming next that the switches 122 and 107 are in the positions shown in FIG. 4, and that the pole of switch 104 is positioned in engagement with the contact thereof connected to auxiliary winding 96, the previously described circuit for the energization of relay 123 is thereby completed, and relay 123 will close its contacts. The closing of the contacts of relay 123 will complete the three previously described circuits for the windings 101, 100 and 94 and the motor will start operating from those three phase windings. When the motor reaches the speed for which the centrifugal switch 106 is set to open, the shunt across the coil of relay 89 will be opened and the following circuit will be completed for the energization of relay 89: from one side of the coil of relay 89, conductor 157, coil 155, and conductor 156 to the other side of the coil of relay 89. Relay 89 is thus energized by the current induced in coil 155 from winding 100 with which the coil 155 is inductively coupled. Relay 89 in energizing will disconnect the three phase windings from the line terminals 80 and 82, and will complete the following circuit for winding 96: from line terminal 80, conductor 138, contact 127, conductor 130, relay contact 91, conductor 95, auxiliary winding 96, the pole of switch 104, conductor 156, conductor 128, relay contact 125, and conductor 136 to line terminal 82. With the disconnection of winding 100 and the connection of winding 96, the inductive coupling between coil 155 and winding 96 will maintain the relay 89 energized. The motor will then run as a single phase motor at a speed determined by the number of poles of winding 96.

If the switch 122 is then operated to its other position to reverse the motor, with the poles 142 and 143 respectively engaging contacts 146 and 148, the holding circuit for relay 123 will be broken and relay 124 will be de-energized. The previously described circuit for the energization of relay 124 will then be completed and that relay will operate to close its contacts. The following shunt circuit across the coil of relay 89 will thereby be completed: from one side of the coil of relay 89, conductor 157, the pole and contact 113 of switch 107, conductor 153, contact 146, pole 142 of switch 122, conductor 144, conductor 136, conductor 139, relay contact 131 of relay 124, conductor 128, and conductor 156 to the other side of the coil of relay 89. This shunt circuit will cause relay 89 to be de-energized, opening the circuit for winding 96 at relay contact 91 and establishing the three previously described circuits for the reverse operation of the motor from windings 101, 100 and 94 at relay contacts 90 and 92. The three circuits to the windings 101, 100 and 94 have been above described as including the contacts 131, 132 and 133 of relay 124.

The reverse torque then applied to the motor by the windings 101, 100 and 94 will cause the motor to slow down, and when the speed is reached for which the centrifugal switch 106 is set to close, that switch will close completing a shunt circuit across the coil of relay 89. After the motor comes to a stop and begins rotating in the reverse direction, the direction sensing switch 107 will operate to move the pole thereof from engagement with contact 113 to engagement with contact 114. Although this operation breaks the previously described shunt across the coil of relay 89, relay 89 will not again be energized because of the shunt now maintained thereacross by the centrifugal switch 106. When the motor reaches the running speed in the reverse direction for which the centrifugal switch 106 is set to open, that switch will open, removing the shunt across the coil of relay 89, and relay 89 will again be energized by the current induced in coil 155 from winding 100. The energization of relay 89 will again break the circuits for windings 101, 100 and 94, and will, at relay contact 91, complete the following circuit for winding 96: from line terminal 81, conductor 137, conductor 141, contact 133 of relay 124, conductor 135, conductor 130, relay contact 91, conductor 95, winding 96, the pole of switch 104, conductor 156, conductor 128, relay contact 131 of relay 124, conductor 139, and conductor 136 to line terminal 82. The motor will again operate as a single phase motor from winding 96, however, in the reverse direction.

The motor may again be reversed in direction of rotation merely by the operation of the switch 122 to return it to the position shown in FIG. 4. With the direction sensing switch 107 now having its pole in engagement with contact 114, the following shunt circuit is completed across the coil of relay 89: from one side of the coil of relay 89, conductor 157, the pole and contact 114 of switch 107, conductor 154, contact 145, pole 142, conductor 144, conductor 136, conductor 139, contact 131 of relay 124, conductor 128, and conductor 156 to the other side of the coil of relay 89. Relay 89 will be de-energized, as will relay 124, and relay 123 will be again energized to complete the previously described circuits for the windings 101, 100 and 94.

The operation of the motor from the windings for the other speeds, auxiliary windings 97 and 98, is similar to that described for winding 96, except for the different positions of the switch 104. As shown in the drawing, the windings 97 and 98 are also inductively coupled to the coil 155 for holding the relay 89 energized when the motor is operated from one of these windings.

I claim:

1. An electric motor comprising three-phase windings, a single phase winding, means for shifting from said three-phase windings to said single phase winding, and reversing means operable to condition said three-phase windings to operate said motor in a reverse direction, said shifting means being operable in response to the operation of said reversing means for shifting from said single phase winding to said three-phase windings for applying a reverse torque to stop said motor.

2. An electric motor as defined in claim 1, wherein said shifting means cooperates with said reversing means to start said motor in a reverse direction, and said shifting means is operable when said motor is operating in said reverse direction to shift from said three-phase windings to said single phase winding.

3. An electric motor comprising three-phase windings for starting and running said motor at one speed, a single phase winding for running said motor at a different speed, means for shifting from said three-phase windings to said single phase winding, and reversing means operable to condition said three-phase windings to operate said motor in a reverse direction, said shifting means being operable in response to the operation of said reversing means for shifting from said single phase winding to said three-phase windings for applying a reverse torque to stop said motor.

4. An electric motor comprising three-phase windings, a plurality of single phase windings, means for selecting one of said single phase windings, means for shifting from said three-phase windings to the selected one of said single phase windings, and reversing means operable to condition said three-phase windings to operate said motor in a reverse direction, said shifting means being operable in response to the operation of said reversing means for shifting from said selected one of said single phase windings to said three-phase windings for applying a reverse torque to stop said motor.

5. An electric motor as defined in claim 4, wherein said selecting means is also selectively operable to render said shifting means inoperable and to maintain said motor running from said three-phase windings.

6. An electric motor comprising three-phase windings, a single phase winding, means including a switch responsive to motor speed, said means being operable to shift said motor from said three-phase windings to said single phase winding when said motor reaches a predetermined speed, and reversing means operable to condition said three-phase windings to operate said motor in a reverse direction, said means including a speed responsive switch being operable in response to the operation of said reversing means for shifting from said single phase winding to said three-phase windings for applying a reverse torque to stop said motor.

7. An electric motor comprising three-phase windings, a plurality of single phase windings, switch means responsive to motor speed and operable at a predetermined speed, means for selecting one of said single phase windings, means including said switch means for shifting from said three-phase windings to the selected one of said single phase windings in response to the operation of said switch means, and reversing means operable to condition said three-phase windings to operate said motor in a reverse direction, said shifting means being operable in response to the operation of said reversing means for shifting from said single phase windings to said three-phase windings for applying a reverse torque to stop the motor.

8. An electric motor comprising three phase windings, a single phase winding, switch means responsive to motor speed and operable at a predetermined speed, relay means including relay contacts associated with said three phase windings and said single phase winding for shifting from said three phase windings to said single phase winding in response to operation of said switch means, reversing means responsive to rotation of said motor in one direction for conditioning said three phase windings to operate said motor in a reverse direction, and two-position direction selecting means cooperating with said reversing means for shifting from said single phase winding to said three phase windings immediately upon movement of said direction selecting means from one of its positions to the other of its positions, said three-phase windings thereby instantly applying a reverse torque to stop said motor.

9. An electric motor as defined in claim 8, wherein said switch means cooperates with said reversing means to start said motor in the reverse direction from said three-phase windings, and said relay means is operable in response to the operation of said switch means when the motor is operating at said predetermined speed in the reverse direction to shift from said three-phase windings to said single phase winding.

10. An electric motor comprising three-phase windings, a single phase winding, shifting means operable to shift said motor from said three-phase windings to said single phase winding, said shifting means including relay means operable to operate said circuit means, means for energizing said relay means, and switch means responsive to motor speed and operable at a predetermined motor speed to control the operation of said energizing means, and reversing means operable to condition said three-phase windings to operate said motor in a reverse direction, said shifting means being operable in response to the operation of said reversing means for shifting from said single phase winding to said three phase for applying a reverse torque to stop said motor.

11. An electric motor as defined in claim 10, wherein said energizing means includes a resistor in series therewith for connection to a pair of line conductors, and said switch means provides a shunt across said relay means removable at said predetermined motor speed.

12. An electric motor as defined in claim 10, wherein said energizing means comprises a coil inductively coupled to said three-phase windings, and said switch means provides a shunt across said relay means removable at said predetermined motor speed.

13. An electric motor as defined in claim 12, wherein said coil is further inductively coupled to said single phase winding for maintaining said relay means operated.

14. An electric motor comprising three-phase windings, a single phase winding, circuit means operable to shift said motor from said three-phase windings to said single phase winding, relay means operable to operate said circuit means, means for energizing said relay means, switch means connected in shunt of said relay means to prevent the operation thereof, said switch means being responsive to motor speed and operable at a predetermined motor speed to remove said shunt from said relay means thereby enabling the operation of said relay means, reversing means operable to condition said three-phase windings to operate said motor in a reverse direction, and second switch means operable in response to the operation of said reversing means for shunting said relay means to thereby render said circuit means inoperable to thereby shift said motor from said single phase winding to said three-phase windings for applying a reverse torque to stop said motor.

15. An electric motor as defined in claim 14, wherein said first switch means cooperates with said reversing means to start said motor in a reverse direction, wherein said second switch means is adapted to remove said shunt from said relay means to render said relay means operable, and wherein said relay means is operable in response to the operation of said first switch means when said motor is operating in said reverse direction to shift said motor from said three-phase windings to said single phase winding.

References Cited by the Examiner

UNITED STATES PATENTS

| | | | |
|---|---|---|---|
| 1,961,793 | 6/1934 | Schaefer | 318—224.1 X |
| 2,743,406 | 4/1956 | London | 318—207.1 X |
| 2,774,924 | 12/1956 | Witt | 318—224.1 |
| 2,816,258 | 12/1957 | Norman | 318—224 X |
| 2,847,629 | 8/1958 | Schaefer | 318—221 X |
| 2,949,730 | 8/1960 | Kenney | 318—224 X |
| 2,959,721 | 11/1960 | Butler | 318—224 X |

JOHN F. COUCH, *Primary Examiner.*

MILTON O. HIRSHFIELD, ORIS L. RADER,
*Examiners.*